Aug. 19, 1958     J. P. REMEIKA     2,848,310

METHOD OF MAKING SINGLE CRYSTAL FERRITES

Filed Dec. 14, 1954

INVENTOR
J. P. REMEIKA
BY
H. O. Wright
ATTORNEY

United States Patent Office 2,848,310
Patented Aug. 19, 1958

2,848,310
METHOD OF MAKING SINGLE CRYSTAL FERRITES

Joseph P. Remeika, Berkeley Heights, N. J., assignor to Bell Telephone Laboratories, Incorporated, New York, N. Y., a corporation of New York Application December 14, 1954, Serial No. 475,239

12 Claims. (Cl. 23—305)

This invention relates to a new method of making single crystal ferrites.

The fact that many of the ferrites of divalent metals are both nonconducting and have desirable magnetic properties makes them very useful in high frequency electric circuit components. Typical ferrites which have enjoyed widespread use are magnesium ferrite, which has the chemical formula $MgFe_2O_4$, and nickel zinc ferrite, which may have the chemical formula

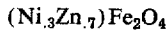

$$(Ni_{.3}Zn_{.7})Fe_2O_4$$

These ferrites are normally produced as a powder formed of many small crystals, and polycrystalline ferrite structures are formed by sintering the powdered ferrites or by molding them in a dielectric binder.

It has recently been determined that single crystals of ferrite material have magnetic properties which are substantially superior to the polycrystalline ferrite components. Single crystals of ferrites have been formed heretofore by the Verneuille, or flame fusion, method. In this process, the compounds from which the ferrite crystals are made are initially in powder form. The ferrite powder is introduced into a high temperature flame such as that of an oxyhydrogen torch. In order to melt the powder, the temperature in the flame must be approximately 1600 degrees centigrade. The molten ferrite crystallizes on a pedestal which is located just below the flame. The mass of crystallized material which forms on the pedestal is termed a "boule." As additional molten material is added to the boule, its upper surface is maintained in the proper position just below the oxyhydrogen flame by appropriately lowering the pedestal.

A principal object of the present invention is to facilitate the manufacture of single crystals of ferrite.

The Verneuille, or flame fusion, method of making single crystal ferrites is subject to several disadvantages. By way of example, one serious disadvantage results from the very high temperature gradient which is present across the boule as the ferrite material is crystallizing and cooling down. This high thermal gradient introduces undesired strains in the crystal structure.

Accordingly, another object of the invention is to eliminate thermal and mechanical strains in single crystals of ferrite.

A second serious disadvantage of the flame fusion process is the difficulty of controlling the composition and valence state of the ferrite crystal which is being formed. Such variations may cause undesired variations in the magnetic properties of the ferrite, or result in a crystal which has undesirably high conductivity.

Therefore, a further object is to eliminate unwanted variations in the magnetic and electrical properties of single crystal ferrites.

Other and further objects will become apparent during the course of the following description and from the appended claims.

In accordance with the present invention, it has been discovered that single crystals of ferrite may be formed by dissolving ferrite material in lead oxide at an elevated temperature, and then crystallizing the ferrite material out of solution by gradually reducing the temperature. A refinement of the process involves the addition of seed crystals to the solution of ferrite material and lead oxide to control crystal growth. After the seed crystals are in the melt, however, it is important that the temperature of the melt is not above the saturation temperature so that the seed crystals do not dissolve. In addition, the crystallization process should start with the seed crystals in a substantially saturated solution in order to avoid rapid and irregular crystal growth.

It is also advantageous to separate the excess lead oxide solvent from the ferrite crystals during the cooling process after the greater portion of the ferrite has crystallized out of solution, but before the lead oxide solidifies around the ferrite crystals. In this manner, undesired mechanical strains, which might otherwise be produced by the solidifying lead oxide, are avoided. The lower temperatures and gradual cooling techniques of the present invention are also helpful in avoiding the mechanical strains introduced by the flame fusion process.

An advantage of the invention lies in the high purity and homogeneous quality of the single crystals of ferrite formed by the present crystallization method, and the resulting low conductivity and uniform magnetic properties of the crystals. This is considered to be particularly remarkable in view of the fact that the lead monoxide which is used for a solvent will normally form lead ferrite when heated with iron oxide.

Other advantages and various features of the invention will become apparent by reference to the following description taken in conjunction with the accompanying drawings forming a part thereof, and from the appended claims.

Figure 1:
Fig. 1 shows a nickel ferrite seed crystal grown directly from a supersaturated solution.
Figure 2:
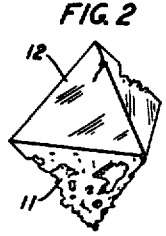
Fig. 2 shows additional growth from a saturated solution on the seed crystal of Fig. 1.
Figure 3:
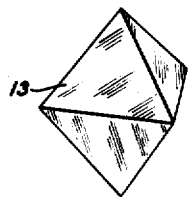
Fig. 3 illustrates a perfect ferrite crystal of octahedral form.

Referring more particularly to the drawings, Figs. 1 through 3 show, by way of example and for purposes of illustration, a series of ferrite crystals grown in accordance with the principles of the present invention. Fig. 1 shows an irregular seed crystal 9 of nickel ferrite which was grown directly from a supersaturated solution of nickel ferrite in lead monoxide.

The crystal 9 of Fig. 1 was used as a seed crystal in another solution of nickel ferrite in lead monoxide, and the regular octahedral crystal form shown at 12 in Fig. 2 resulted. The irregular portion 11 of the crystal of Fig. 2 is a part of the seed crystal 9 which was shielded from new crystal growth. Fig. 3 illustrates a perfect octahedral ferrite crystal structure which is obtained when the upper portion 12 of the crystal of Fig. 2 is in turn employed as the seed crystal.

In growing the seed crystals of the type shown at 9 in Fig. 1, stoichiometric proportions of nickel oxide, NiO, and ferric oxide $Fe_2O_3$, required to make nickel ferrite, $NiF_2O_4$, are added to lead monoxide powder, and are mixed together in a small platinum crucible. The exact weights of each oxide which were employed in one specific experiment are as follows:

| | Grams |
|---|---|
| NiO | 12.00 |
| Fe$_2$O$_3$ | 25.70 |
| PbO | 100.00 |
| | 137.7 |

This corresponds to a weight percentage of 37.7/137.7, or about 27.5 percent nickel ferrite.

The crucible is placed in a furnace at about 1300 degrees centigrade, and is held at this temperature for about one hour. After a homogeneous melt is formed, the temperature is lowered at a rate of about 10 degrees centigrade per hour. The nickel ferrite becomes supersaturated in the lead monoxide solution as the temperature is lowered. Finally, a point is reached where many small crystals are formed in a process termed "nucleation." After nucleation, the crystals of nickel ferrite grow rapidly, until the excess nickel ferrite in the melt is crystallized out of solution. Because of the rapid growth from the supersaturated solution, these crystals have many defects. Specifically, some lead monoxide is enclosed within the crystals, and as illustrated in Fig. 1, other irregularities such as holes and skeletal growth are apparent.

Figure 4:
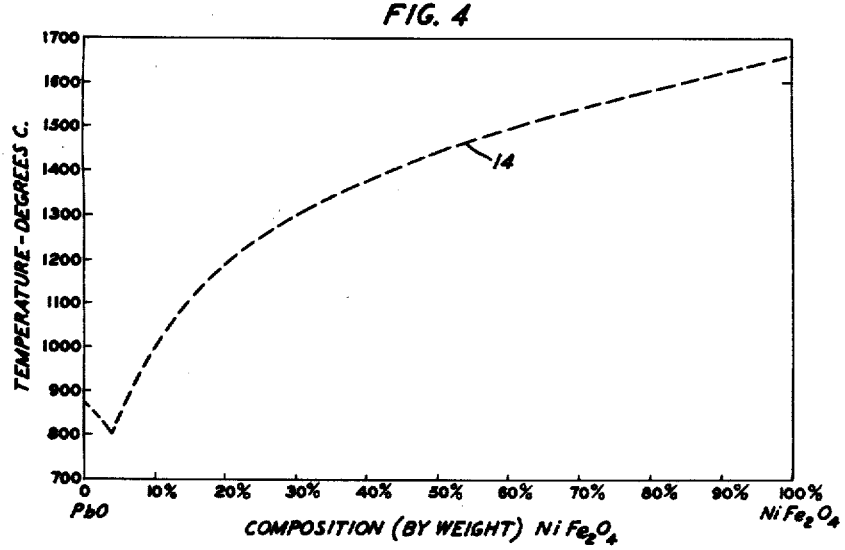
Fig. 4 is a partial phase diagram indicating the amount of nickel ferrite which will dissolve in lead monoxide at various temperatures.
Figure 5:
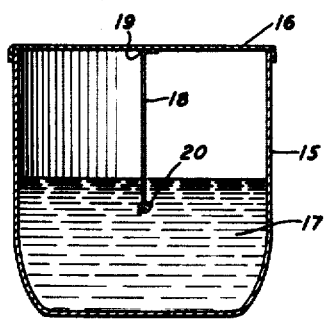
Fig. 5 illustrates an arrangement for growing single ferrite crystals in which a seed crystal is employed to control crystal growth.

By techniques which will be described in connection with Figs. 4 and 5, however, nearly perfect crystals such as that shown at 12 and 13 in Figs. 2 and 3, respectively, may be grown. In the partial phase diagram of Fig. 4, the amount of NiFe$_2$O$_4$ which will dissolve in PbO is plotted against temperature. The extreme left and right hand points in this plot are determined by the melting points of lead monoxide (888 degrees centigrade) and nickel ferrite (1660 degrees centigrade), respectively. Between these two limits, the solubility is substantially that indicated by the dashed line curve 14 of Fig. 4. While the curve 14 shows the general nature of the solubility curve, it is important to determine the nature of the solubility curve with considerable accuracy in the vicinity of the maximum temperature which is to be employed. In the present instance, 1300 degrees centigrade was selected as a desirable temperature from which to start the crystallization process. This temperature represents a balance between the higher temperatures at which the oxides in the melt would react with the platinum crucible, and lower temperatures at which very little of the nickel ferrite will dissolve in the lead oxide.

Accordingly, the following tests were employed to determine the solubility of nickel ferrite in lead monoxide at 1200 degrees centigrade and at 1300 degrees centigrade. Using NiO and Fe$_2$O$_3$ powders in stoichiometric proportions, charges were made containing 25, 28, and 30 weight percentage of NiFe$_2$O$_4$ in PbO. Three seed crystals of approximately equal size were placed in the bottom of each crucible. The melts were held at 1300 degrees centigrade for one hour and were then cooled at a rate of 5 degrees centigrade per hour to solidification. It was found that in the 25 weight percentage case there was no seed survival; in the 28 percent case, seed survival was questionable; and in the 30 percent case, the three seeds survived and grew. One of these crystals is pictured in Fig. 2 with the new growth indicated at 12. Microscopic examination of the new growth showed that it contains very few cavities or other irregularities, particularly as compared with the seed crystal portion 11 of the crystal. A similar experiment was performed at 1200 degrees centigrade using 15, 18, and 20 weight percentage of NiFe$_2$O$_4$ with the other conditions of the experiment being the same as in that discussed above. In this case, it was found that the seeds grew only in the 20 percent case. It was therefore determined that 20 weight percentage of NiFe$_2$O$_4$ is required for saturation at 1200 degrees centigrade and 30 weight percentage of the nickel ferrite is required at 1300 degrees centigrade.

The improved structure of the portion 12 of the crystal shown in Fig. 2 is attributed to the uniform rate of growth of the crystal as contrasted with the abnormally rapid growth of crystals grown from supersaturated melts. A preferred method of growing crystals is shown in Fig. 5, in which a platinum crucible 15 is provided with a lid 16. The crucible 15 is partially filled with a melt 17 of a ferrite such as nickel ferrite and lead monoxide. A wire 18 is spot-welded at 19 to the lid 16 of the crucible. An improved seed crystal 20 which may be made from the upper portion 12 of the crystal of Fig. 2 is suspended in the melt 17 by means of the platinum wire 18.

The proportions of the ferrite material and lead monoxide are chosen in view of the temperature to which the melt will be raised, so that the solution will be just saturated. This is required so that all of the ferrite material will go into solution, but the seed crystal will not dissolve. For example, referring to Fig. 4, if the starting temperature is to be 1250 degrees centigrade, approximately 25 weight percentage of nickel ferrite should be employed. Then, as the temperature is gradually reduced, the solution will follow the plot 14 of Fig. 4 toward the left, and the excess NiFe$_2$O$_4$ will crystallize out and gradually increase the size of the seed crystal 20.

If desired, the mixture of lead monoxide and ferrite powders may be heated to a point well above saturation to increase the speed of forming the melt. The temperature of the melt is then lowered to the saturation temperature for the proportions of ferrite and lead monoxide which have been used, and the seed crystal is added. The temperature is then further reduced as disclosed above.

After the ferrite crystals have been formed, there are two possible methods for separating them from the lead monoxide. One method is to cool the solution to below the melting point of lead monoxide (888 degrees), and then dissolve the lead monoxide from the ferrite crystals in a 1:1 solution of nitric acid and water. Another alternative is to separate the lead monoxide from the ferrite crystals at a temperature slightly above 888 degrees centigrade. The latter method is preferred because it avoids the mechanical strain which occurs when the ferrite crystals are enclosed in the solidified lead monoxide. There are several procedures available for avoiding the solidification of the lead monoxide around the ferrite crystals. In the arrangement of Fig. 5, this may be readily accomplished by removing the lid 16 of the crucible 15 while the lead monoxide is still liquid, and thus withdrawing the crystal 20 from the melt 17. When the seed crystals are merely placed in the crucible, the same object may be accomplished by removing the crucible from the furnace and pouring the lead monoxide off.

When the crystals are separated from the lead monoxide, the outer surface of the crystals tends to be strained. This may result from the sudden crystallization of a layer of ferrite as the molten material is separated from the crystal, or from the thermal shock incident to suddenly cooling the outer surface of the crystal. The surface stain of irregularities may be eliminated by removing the outer surface through appropriate machining operations, or by etching the crystal.

While the foregoing discusion has been directed principally to the case of nickel ferrite, polymetallic ferrite crystals of many other predominantly divalent metals may also be formed by the techniques described hereinabove. As employed in the present specification and claims, the term "polymetallic" ferrite designates ferrites which include one or more other metals as a principal component in addition to the iron which is present. By way of example, single crystals of polymetallic ferrites having formulas such as $(Ni_{.5}Zn_{.5})Fe_2O_4$ have been successfully grown using the lead monoxide solvent.

Other ferrites which have also been successfully crystallized out of the lead monoxide solution include the ferrites of copper, manganese, calcium, strontium, and barium, in addition to those listed in Table I.

The crystals of several ferrites, which were made without the use of seed crystals, were analyzed chemically The results of these analyses are tabulated in Table I.

TABLE I

*Chemical composition of self-nucleated ferrite crystals*

| Divalent Metal | Percentage of Iron by Weight | | Percentage of Divalent Metal by Weight | | Percentage of Lead by Weight |
|---|---|---|---|---|---|
| | Calculated | Chemical Analysis | Calculated | Chemical Analysis | |
| Nickel | 47.70 | 44.62 | 25.04 | 25.00 | 0.2 |
| Cobalt | 47.60 | 45.00 | 25.12 | 26.89 | 0.25 |
| Zinc | 46.33 | 44.79 | 27.12 | 27.25 | 0.15 |
| Magnesium | 55.84 | 54.62 | 12.16 | 12.68 | 0.39 |
| Cadmium | 38.77 | 37.43 | 39.02 | 38.30 | 0.56 |

The surprising result indicated by the foregoing table is the relatively small amounts of lead which are present in the ferrite crystals. This is particularly remarkable when it is recognized that lead monoxide, when heated with $Fe_2O_3$, will form a lead ferrite. When this fact is considered, it would appear quite probable that mixed crystals of lead ferrite and that of the divalent metal would be formed. However, the single crystals of ferrite are actually of very nearly true stoichiometric proportions, as indicated in the foregoing table.

In retrospect, it is believed that the large size of the lead atom is probably responsible for the purity of the crystals. As the desired ferrites start to crystallize out of solution, it is believed that the large size of the lead atom prevents its acceptance into the ferrite crystal lattice.

Although it is not shown in the foregoing table, platinum from the crucible was also present in some of the crystals. The percentages were generally less than 1 percent but ranged from 0.36% to 1.62%. However, the presence of such small amounts of platinum does not adversely affect the electrical or magnetic properties of the crystals, to any substantial extent.

The ferrites of many of the metals discussed hereinabove have a spinel crystal structure. The pointed octahedral shape of the spinel shown in Fig. 3 is characteristic of the magnesium aluminate crystal structure. The spinel crystal lattice has also been termed the "cubic" crystal structure by J. L. Snoek and his coworkers in the Netherlands, who did much of the early work in this field. The ferrites of nickel, copper, zinc, magnesium, manganese, cobalt and cadmium have this spinel or magnesium aluminate structure. As mentioned above, crystals of relatively high purity of all of the foregoing ferrites having the spinel structure have been successfully crystallized out of the lead monoxide solution. It is also believed that the difference between the spinel crystal structure of the foregoing ferrites and the hexagonal crystal structure of lead ferrite may contribute to the purity of the spinel ferrite crystals, and the absence of substantial amounts of lead from the chemical compositions listed in Table I.

Calcium, strontium, and barium ferrite have also been successfully crystallized from the lead monoxide solution, despite their hexagonal crystal structure. The larger ionic radii of these elements as compared with the elements which form spinel structures appears to be responsible for their hexagonal structure. Because the ionic radius of calcium is only slightly greater than that of cadmium, for example, mixed ferrites including a substantial amount of calcium may be formed which have the spinel structure.

In making copper and manganese ferrite by the method described hereinabove, care must be taken not to overheat the lead monoxide and copper or manganese ferrite in a platinum crucible. If the melt is overheated, the manganese or copper may be oxidized to higher valence states (than two) and free lead may be released from the lead monoxide. The lead may combine with the platinum in the crucible to form an alloy which will have a low melting point, and the crucible may be destroyed. Fortunately, however, copper and manganese ferrites are both highly soluble in lead monoxide, and adequate quantities of these ferrites will dissolve in lead monoxide at low temperatures such as 1150 degrees centigrade, for example.

In the present specification and claims, the phrase "gradually reducing the temperature" is frequently employed. It is to be understood that when this phrase is employed, it refers to a reduction of temperature at a rate less than 30 degrees centigrade per hour.

It is to be understood that the above-described arrangements are illustrative of the application of the principles of the invention. Numerous other arrangements, such as dissolving the powdered ferrite of divalent metals instead of ferric oxide and the oxides of the divalent metals in lead monoxide, may be devised by those skilled in the art without departing from the spirit and scope of the invention.

What is claimed is:

1. A method of making single crystals of ferrite comprising heating lead oxide and the constituent components of a polymetallic ferrite having a spinel crystal structure to a temperature above 880 degrees centigrade at which the ferrite is dissolved in the lead monoxide, and crystallizing the ferrite material out of solution by reducing the temperature of the melt at a rate less than 30 degrees centigrade per hour.

2. The method of making single crystal ferrites comprising the steps of dissolving the constituent components of nickel ferrite in lead monoxide and crystallizing the nickel ferrite out of solution by reducing the temperature of the melt at a rate less than 30 degrees centigrade per hour.

3. The method of making single crystal ferrites comprising the steps of dissolving the constituent components of cobalt ferrite in lead monoxide and crystallizing the cobalt ferrite out of solution by reducing the temperature of the melt at a rate less than 30 degrees centigrade per hour.

4. The method of making single crystal ferrites comprising the steps of dissolving the constituent components of magnesium ferrite in lead monoxide and crystallizing the magnesium ferrite out of solution by reducing the temperature of the melt at a rate less than 30 degrees centigrade per hour.

5. The method of making single crystal ferrites comprising the steps of dissolving the constituent components of zinc ferrite in lead monoxide and crystallizing the zinc ferrite out of solution by reducing the temperature of the melt at a rate less than 30 degrees centigrade per hour.

6. The method of making single crystal ferrites comprising the steps of dissolving the constituent components of cadmium ferrite in lead monoxide and crystallizing the cadmium ferrite out of solution by reducing the temperature of the melt at a rate less than 30 degrees centigrade per hour.

7. In a process for making single crystal ferrites, the steps of heating lead oxide and the constituent components of a polymetallic ferrite having a spinel crystal structure to a temperature above 880 degrees centigrade at which the ferrite is dissolved in the lead monoxide, and cooling the ferrite to obtain seed crystals of ferrite; dissolving more of the selected polymetallic ferrite in lead oxide, heating the melt to a temperature which is at least as high as the saturation temperature for the ferrite in the lead oxide, adding the seed crystals to the melt of ferrite material and lead oxide, and lowering the temperature of the melt at a rate less than 30 degrees centigrade per hour.

8. A method as defined in claim 7, wherein the temperature of the ferrite and lead oxide melt is maintained at or below a temperature which is not substantially above the saturation temperature after the seed crystals are added to the mixture so that the seed crystals will not dissolve, wherein the crystallization process is started with the seed crystals in the melt and the temperature substantially at the saturation temperature, and wherein the temperature of the melt is thereafter reduced at a rate less than 30 degrees centigrade per hour.

9. The method of making single crystal ferrites comprising heating lead oxide and the constituent components of a polymetallic ferrite having a spinel crystal structure to a temperature above 880 degrees centigrade at which the ferrite is dissolved in the lead monoxide, crystallizing the selected ferrite material out of solution by reducing the temperature of the melt at a rate less than 30 degrees centigrade per hour, and separating the crystallized ferrite and the liquid lead monoxide at a temperature above the melting point of the liquid lead monoxide.

10. The method of making single crystal ferrites comprising heating lead oxide and the constituent components of a polymetallic ferrite having a spinel crystal structure to a temperature above 880 degrees centigrade at which the ferrite is dissolved in the lead monoxide, crystallizing the selected ferrite material out of solution by reducing the temperature of the melt at a rate less than 30 degrees centigrade per hour, separating the crystallized ferrite and the lead monoxide material, and removing the outer surface of the ferrite crystal.

11. The method of making single crystal ferrites comprising dissolving the constituent components of at least one ferrite selected from the group consisting of the ferrites of magnesium, zinc, cadmium, cobalt, nickel, manganese and copper in lead monoxide, and crystallizing the selected ferrite material out of solution by reducing the temperature of the melt.

12. A method of making single crystals of ferrite comprising crystallizing from a solution of lead monoxide a polymetallic ferrite having a spinel crystal structure by reducing the temperature of the solution at a rate less than 30 degrees centigrade per hour.

References Cited in the file of this patent

UNITED STATES PATENTS

| | | |
|---|---|---|
| 2,452,529 | Snock | Oct. 26, 1948 |
| 2,452,576 | Kjellgren et al. | Nov. 2, 1948 |

OTHER REFERENCES

Galt et al.: "Properties of Single Crystals of Nickel Ferrite" in "Physical Review," vol. 79, 1950, pages 391 and 392.